Oct. 15, 1929.  A. L. ATHERTON  1,731,367
SYSTEM OF TRANSMISSION
Filed Aug. 20, 1924
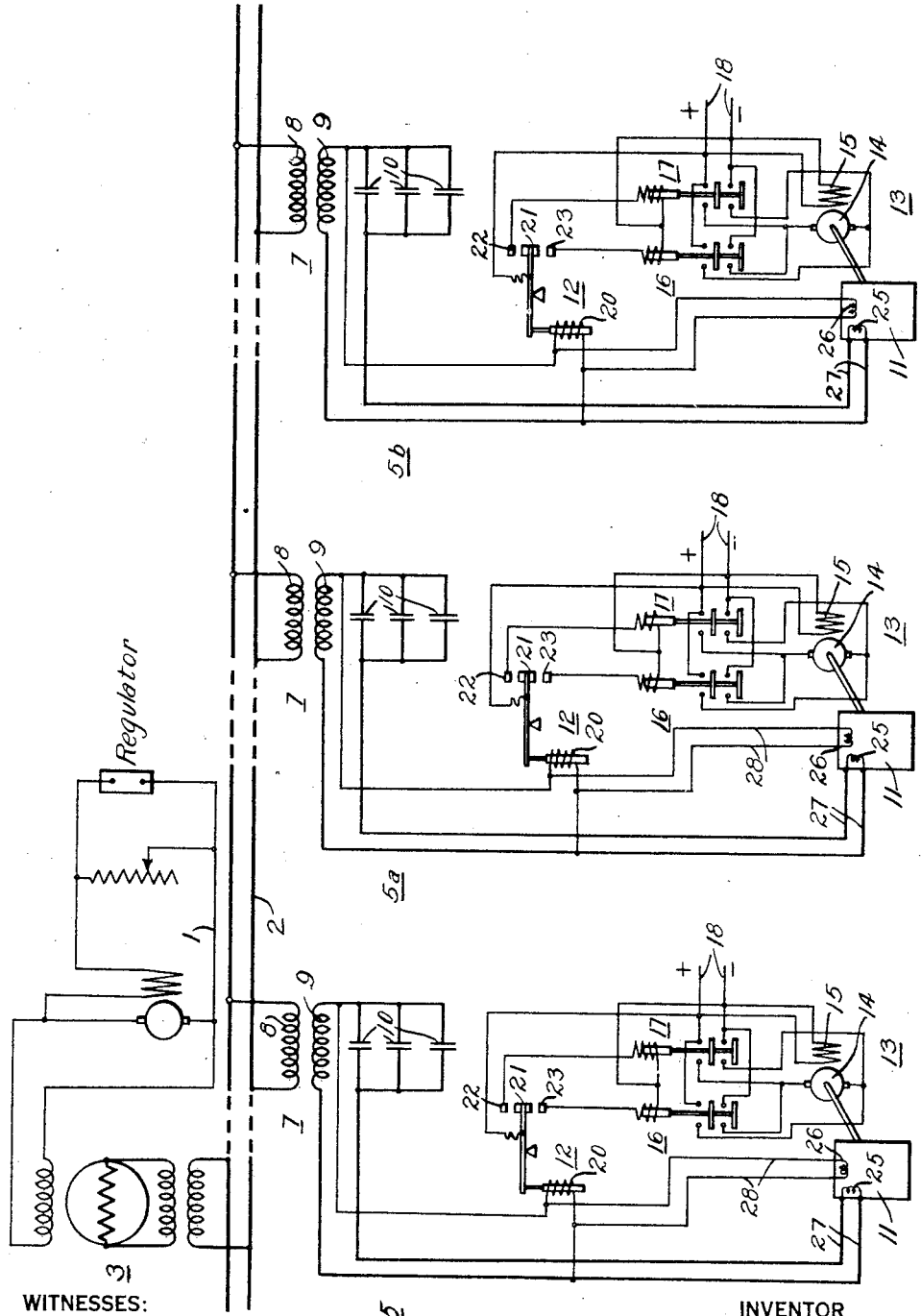
WITNESSES:
INVENTOR
Alfred L. Atherton
BY
ATTORNEY Patented Oct. 15, 1929

1,731,367

UNITED STATES PATENT OFFICE

ALFRED L. ATHERTON, OF PITTSBURGH, PENNSYLVANIA, ASSIGNOR TO WESTINGHOUSE ELECTRIC & MANUFACTURING COMPANY, A CORPORATION OF PENNSYLVANIA

SYSTEM OF TRANSMISSION

Application filed August 20, 1924. Serial No. 733,036.

My invention relates to electrical power transmission lines or systems, and particularly to the regulation of such lines for the transmission of power at high-voltage over long distances.

In a copending application of Frank G. Baum, Serial No. 569,704, filed June 20, 1922, patented February 8, 1927, No. 1,617,007, is shown a system that is particularly adapted to the high-voltage long-distance transmission of electrical power, this system embodying a plurality of synchronous condensers that are spaced along the line at remote intervals, and are adapted to provide the wattless current that is required in each section of the line between condenser stations, whereby substantially constant voltage may be maintained throughout a relatively long transmission line.

One object of my invention is to provide a transmission system of this general type wherein reactive means, preferably condensers, are associated with the transmission line, together with induction regulator means for automatically regulating the effect of said condenser means upon the line.

More specifically stated, it is an object of my invention to provide suitable static condensers in lieu of the above-mentioned syncronous condensers and employ induction regulators that are governed in accordance with the line voltage for modifying the effect of the static condensers to thereby maintain a substantially constant voltage upon the line.

Other objects of my invention will become evident from the following detailed description taken in conjunction with the accompanying drawing, wherein the single figure is a diagrammatic representation of a transmission system organized in accordance with my present invention.

Referring to the drawing, the system here shown comprises a relatively high-voltage and long-distance transmission line embodying conductors 1 and 2, which may be supplied at various points from suitable steam or hydraulically driven generating stations 3, which are regulated for constant voltage, as shown.

While, for the sake of simplicity, I have illustrated my invention as applied to a single phase transmission line, it will be understood that in actual practice a three-phase line will be employed and that the principles of my invention may be readily applied thereto by those skilled in the art.

At points spaced along the system at remote intervals, such as 100 miles, a plurality of condenser substations 5, 5a, and 5b, for example, are connected across the line. Each condenser substation is shown as comprising a step-down transformer 7 having a primary winding 8 and a secondary winding 9 that is connected in circuit with a suitable number of reactive means, such as static condensers 10, and with an induction regulator 11.

A contact-making volt-meter 12, or the like, is energized in accordance with the voltage of the secondary transformer winding 9 for the purpose of effecting operation of a pilot motor 13 in the one direction or the other to properly actuate the induction regulator 11.

The pilot motor 13 may be of any suitable or well-known type, and is here shown as comprising a commutator type armature 14, and a separately excited field winding 15. A pair of reversing switches 16 and 17, which are controlled by the contact-making voltmeter 12, are adapted to control the connections of the armature 14 relative to the field winding 15, which is always energized in the same direction from a suitable supply circuit 18, from which the armature 14 is also energized in accordance with the positions of the reversing switches 16 and 17.

The contact-making volt-meter 12 comprises a voltage coil 20, which is connected across the secondary transformer winding 9 for governing a suitable lever system, whereby a movable contact member 21 is adapted to engage an upper stationary contact member 22, or a lower stationary contact member 23, in accordance with the position of a core that is actuated by the coil 20 or, in other words, in accordance with the voltage of the secondary transformer winding 9 and, therefore, the line voltage.

The induction regulator 11 may be of any well-known type comprising essentially a movable or current winding 25, which is connected through conductors 27 in series relation with the secondary transformer winding 9 and the static condensers 10, and a stationary or voltage winding 26, which is connected through conductors 28 across the terminals of the transformer winding 9. The current winding 25 is preferably mounted on a rotor to be driven by the motor 13, in accordance with a familiar practice.

The operation of my invention may be set forth as follows: Under the illustrated conditions, wherein the contact-making volt-meter 12 occupies a neutral or inoperative position, the normal value of the line voltage obtains across line conductors 1 and 2, whereby the proper degree of leading or lagging current, as controlled by the sets of static condensers 10, is present in the line. However, if the load upon the transmission line increases, tending to cause a drop in line voltage, the decreased energization of the voltage coil 20 of the contact-making volt-meter 12 thereupon permits the movable contact member 21 to engage the lower stationary contact member 23. The reversing switch 16 is thereupon closed to effect actuation of the pilot motor 13 in such a direction as to raise the line voltage through the agency of the transformer 7, and thus increase the amount of leading current that is exchanged between the condensers and the transmission line.

On the other hand, if the line voltage increases as the result of reduction in load, or for any other reason, then the voltage coil 20 of the contact-making volt-meter 12, is energized more strongly to cause the movable contact member 21 to engage the upper movable contact member 22, and, by effecting operation of the reversing switch 17, produce operation of the induction regulator in the opposite direction, thus decreasing the amount of leading current or increasing the amount of lagging current that is drawn over the line from the corresponding condenser station.

It will be seen that, by the use of my invention, the corrective action of static condensers upon a transmission line may be automatically regulated in accordance with the line voltage to produce the desired correspondence of leading or lagging current to load conditions and to maintain a substantially constant voltage on the line under all loads.

I do not wish to be restricted to the specific arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. A transmission system comprising a transmission line, condenser means associated therewith, an induction regulator having one coil in series relation with said condenser means, a separate prime mover for regulating the position of said induction regulator, and means responsive to line voltage for effecting the energization of said prime mover in the one direction or the other in accordance with departures of the line voltage from a desired value.

2. A transmission system comprising a transmission line, a static condenser connected thereto, an induction regulator having one coil in series relation with said static condenser, a separate prime mover for regulating the postion of said induction regulator, and means responsive to line voltage for effecting the energization of said prime mover in the one direction or the other in accordance with departures of the line voltage from a desired value.

3. A transmission system comprising a transmission line, reactive means connected thereto, an induction regulator having one coil in series relation with said reactive means and another coil in parallel relation thereto, a separate source of motive power mechanically coupled to said induction regulator for adjusting the same and means responsive to line voltage for effecting the energization of said separate source of motive power in the one direction or the other in accordance with departures of the line voltage from a desired value.

4. A transmission system comprising a transmission line, variable voltage transforming means connected in shunt thereto, reactive means associated with said variable voltage transforming means, whereby the reactive current varies with the voltage ratio, means comprising a separate prime mover for effecting a change in the voltage ratio of said voltage transforming means, and means responsive to voltage conditions on the transmission line for effecting the energization of said prime mover in the one direction or the other in accordance with departures of the line voltage from a desired value.

5. A transmission system comprising a transmission line, variable voltage transforming means connected in shunt thereto, static reactive means associated with said variable voltage transforming means, whereby the reactive current varies with the voltage ratio, means comprising a separate prime mover for effecting a change in the voltage ratio of said voltage transforming means, and means responsive to voltage conditions on the transmission line for effecting the energization of said prime mover in the one direction or the other in accordance with departures of the line voltage from a desired value.

6. A transmission system comprising a transmission line, variable voltage transforming means connected in shunt thereto, reactive means including a static condenser associated with said variable voltage transforming means, whereby the reactive current varies with the voltage ratio, means comprising a separate prime mover for effecting a change in the voltage ratio of said voltage transforming means, and means responsive to voltage conditions on the transmission line for effecting the energization of said prime mover in the one direction or the other in accordance with departures of the line voltage from a desired value.

7. In a high-voltage, long-distance polyphase transmission line of such length as to require wattless currents to be supplied thereto at one or more intermediate points, in order to admit of the transmission of the required through power, the combination including, at each of said point or points, a static condenser bank, variable voltage means for connecting said bank to said line, and means responsive to the voltage conditions on the line for effecting the adjustment of said variable voltage means in the one direction or the other in accordance with departures of the line voltage from a desired value.

In testimony whereof, I have hereunto subscribed my name this 16th day of August, 1924.

ALFRED L. ATHERTON.